H. R. RIVERS-MOORE & J. McL. DONALD.
CONTACTOR COMMUTATOR FOR DYNAMO ELECTRIC MACHINES.
APPLICATION FILED OCT. 5, 1907.

917,898.

Patented Apr. 13, 1909.

WITNESSES
Fred White
Rene Nuine

INVENTORS:
Henry Rivers Rivers-Moore
and John McLeod Donald,
By their Attorneys

UNITED STATES PATENT OFFICE.

HENRY RIVERS RIVERS-MOORE AND JOHN McLEOD DONALD, OF LONDON, ENGLAND.

CONTACTOR-COMMUTATOR FOR DYNAMO-ELECTRIC MACHINES.

No. 917,898.   Specification of Letters Patent.   Patented April 13, 1909.

Application filed October 5, 1907. Serial No. 369,033.

*To all whom it may concern:*

Be it known that we, HENRY RIVERS RIVERS-MOORE, of 37 Kempsford Gardens, Earl's Court, London, England, engineer, and JOHN McLEOD DONALD, of 49 Shepherds Bush road, London, England, engineer, have invented a certain new and useful Contactor-Commutator for Dynamo-Electric Machines, of which the following is a specification.

This invention relates to commutators for dynamo electric machines, of the kind in which the current is taken from the commutator by means of contactors movable relatively to the commutator segments.

The present invention is characterized by the employment of means whereby the contactors are moved relatively slowly against the collector segments, but suddenly released therefrom to effect a rapid break. This enables direct current machines to be built for far higher voltages than have been hitherto possible.

Figure 1:
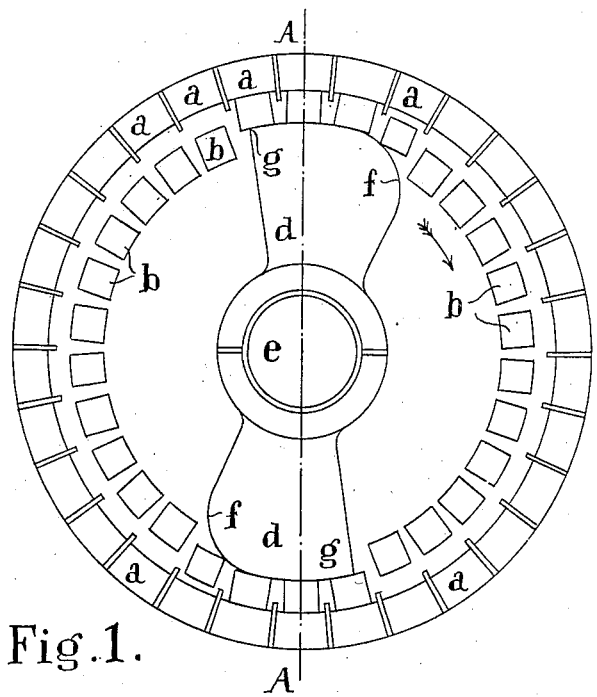
Figure 2:
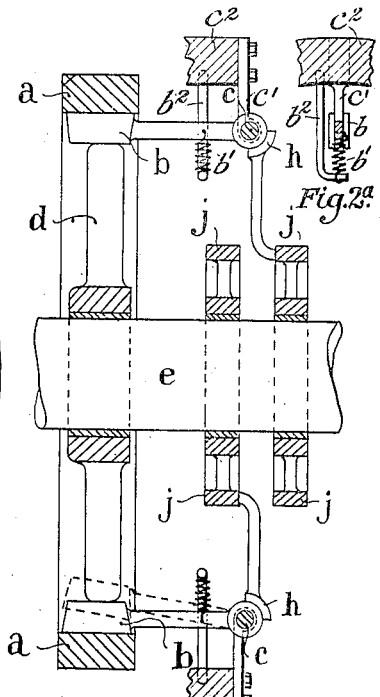
Figure 3:
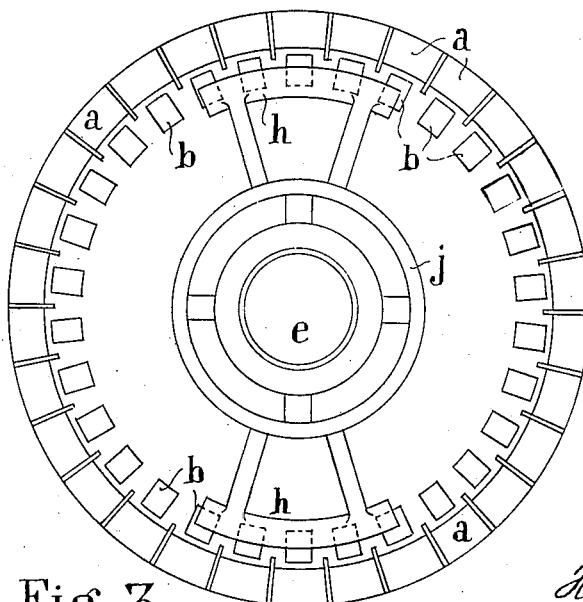

In the accompanying diagrammatic drawings:—Figure 1 is an end view of one form of arrangement in accordance with this invention, showing for the sake of example a machine with an external stationary armature and rotating field; Fig. 2 is a section on line A—A, Fig. 1, and showing the means for supporting the pivots of the movable contactors and for returning the contactors when the same are released. Fig. 2ª being a detail end view of the contactor return springs. Fig. 3 is an end view of the apparatus seen from the right of Fig. 2, with the contactor supporting ring and return springs removed.

$a$ . . . . . are the commutator segments, and $b$ . . . . . are the contactors each pivoted as at $c$ . . . . in a series of brackets $c'$ attached at intervals around a ring $c^2$ fixed to any suitable part of the machine. Each of said contactors corresponds to one commutator segment. The contactors $b$ . . . . are normally held out of contact with the segments $a$ . . . . by the pull of springs $b'$ . . . . secured to bent pins $b^2$ fixed to the ring $c^2$.

$d\ d$ are cams secured to the shaft $e$ and adapted to rotate therewith so as to operate on the contactors $b$ . . . . successively to make contact with the commutator segments $a$ . . . . . The cams $d\ d$ are so arranged that each always holds two or more contactors in contact with their corresponding commutator segments. The cams $d\ d$ are rounded on their leading edges as at $f$ and sharp on their rear edges as at $g$ in order that the contactors $b$ may be gradually and smoothly brought into contact with the commutator segments and suddenly released therefrom by the springs $b'$ to effect a rapid and direct break.

$h\ h$ are collectors establishing connection between the pivoted ends of the contactors and slip rings $j\ j$ from which the current is finally led by means of brushes. The collectors $h\ h$ rotate with the cams $d\ d$ and make connection with a greater number of contactors than are actually in contact with commutator segments. In this manner the collectors make and break contact only with contactors which are "dead."

By the use of an arrangement in accordance with this invention, better insulation of the commutator segments may be provided than is possible in the ordinary construction where the surface of the commutator must be smooth. By means of this possibility of improved insulation and by absence of sliding brushes on the commutator, "flashing over" can be eliminated and high voltage per segment is rendered possible. The quick break obtained by the use of contactors also tends to reduce inductive sparking, which may be further diminished by magnetic or other blow-out.

By means of this invention a stationary armature may be employed without having a complicated rotating brush gear, and the benefit of having a stationary armature for high voltage machines requiring high insulation is well known.

It will be understood that if the construction is such that the commutator rotates, the cams $d$ are stationary, this being an inversion of the present construction.

What we claim, and desire to secure by Letters Patent, is:

1. Apparatus for taking off current from the armatures of dynamo electric machines, comprising in combination with contactors movable relatively to the commutator segments, means for moving the contactors gradually against the commutator segments and means for rapidly returning them out of contact therewith.

2. Apparatus for taking off current from the armatures of dynamo electric machines, comprising in combination contactors movable relatively to the commutator segments, a rotary member adapted in its rotation to move the contactors gradually against said segments, and means for rapidly returning the contactors out of contact with said segments.

3. Apparatus for taking off the current from the commutators of dynamo electric machines, comprising in combination pivoted contactors, a rotary cam adapted in its rotation to move the contactors gradually against the commutator segments and to free the same suddenly, and springs for returning the contactors out of contact with the segments when freed by the cam.

In witness whereof, we have hereunto signed our names in the presence of two subscribing witnesses.

HENRY RIVERS RIVERS-MOORE.
   JOHN McLEOD DONALD.

Witnesses to the signature of Henry Rivers Rivers-Moore:
 GORDON MELVILLE CLARK,
 ALFRED BEESLEY CAMPBELL.

Witnesses to the signature of John McLeod Donald:
 R. SWIRE GRIFFITHS,
 O. M. ELLIS.